United States Patent [19]
LeCapelain

[11] Patent Number: 4,470,821
[45] Date of Patent: Sep. 11, 1984

[54] LANGUAGE TEACHING KIT

[76] Inventor: Laurence LeCapelain, 2056 Lakeshore Rd., R.R. #5, Sarina Township, Ontario, Canada

[21] Appl. No.: 425,308

[22] Filed: Sep. 28, 1982

[30] Foreign Application Priority Data

Jul. 23, 1982 [CA] Canada .................. 407944

[51] Int. Cl.³ .............................................. G09B 17/00
[52] U.S. Cl. ...................................... 434/172; 273/272
[58] Field of Search ................ 434/170, 172; 273/272

[56] References Cited

U.S. PATENT DOCUMENTS

| | | | |
|---|---|---|---|
| 2,091,555 | 8/1937 | Messinger | 434/172 |
| 2,204,931 | 6/1940 | Gonzalez | 434/167 |
| 2,913,137 | 11/1959 | Alatorre | 220/20 |
| 3,116,927 | 1/1964 | Kuhlman | 434/172 |
| 3,389,480 | 6/1968 | Holland | 434/170 X |
| 3,654,712 | 4/1972 | Bagdasar | 434/172 X |
| 4,084,816 | 4/1978 | Shafer | 273/1 R |
| 4,132,406 | 1/1979 | Ginsberg | 273/1 R |
| 4,142,305 | 3/1979 | Zegel | 434/109 |

Primary Examiner—William H. Grieb
Attorney, Agent, or Firm—Charles W. Fallow; Martin P. Hoffman; Mitchell B. Wasson

[57] ABSTRACT

A kit for teaching grammatical aspects of language comprises a plurality of question cards. Each card contains a different sentence of a predetermined number of words, and a plurality of answer cards each of which contains a sentence corresponding to that appearing on one of the question cards, and each of which bears indicia displaying the correct parsing of the sentence at a given level of complexity, there being at least one answer card corresponding to each question card. A plurality of answer forming chips, each being color coded to represent different basic parts of speech or speech functions is provided and at least some of these bear indicia further qualifying the basic parts of speech. At least one answer forming chip support is provided to receive and support, for visual display, sufficient chips to identify and qualify each word, phrase or clause forming each sentence on each question card at a given level of complexity.

8 Claims, 7 Drawing Figures

SINGERS MUST LEARN TO CONTROL THEIR BREATHING YET LOOK RELAXED AND AT EASE.

YOU MAY BORROW MY PENCIL IF YOU PROMISE TO RETURN IT.

LANGUAGE TEACHING KIT

BACKGROUND OF THE INVENTION

1. Field of the Invention

This application relates to kits adapted for use in teaching language, and particularly sentence structure, grammar and standard language usage.

2. Description of the Prior Art

Regardless of the language involved, the teaching of sentence structure, grammar and language usage is frequently made difficult by the fact that the concepts and rules involved are abstract, in the sense that they do not readily lend themselves to visual display. Accordingly, when a student is being taught to parse a sentence, or analyse it grammatically, he is required to memorize a number of terms and rules which cannot be visually associated with a sentence under consideration. The result of this is that students tend to find the teaching of sentence structure, grammar and language usage to be both boring and difficult.

The object of the present invention is to facilitate both the teaching and learning of language through the visual demonstration of sentence structure, grammar and usage by means of a three dimensional, colour coded representation. Further, it is an object of the present invention to create interest in the learning of such skills through the provision of a kit which permits, not only a three dimensional colour coded display of sentence structure, grammar and usage, but which also permits such skills to be taught and learned in discrete stages of ever increasing complexity, and in the form of a game which provides both the element of amusement and competition to maintain the interest of a student and facilitate and enhance the learning process.

Attempts have been made over the years to provide visual aids to facilitate the teaching of certain aspects of language, such as spelling, although none of the prior devices would be useful in teaching the grammatical and usage aspects of language in a comprehensive manner. For example, the Bagdassar U.S. Pat. No. 3,654,712, dated Apr. 11, 1972, discloses a teaching aid kit which includes cards and a stand for each pupil and which may be used as an aid in teaching different subjects such as the alphabet, spelling and mathematics at rather elementary levels. For example, the patent contemplates teaching of the alphabet through the use of cards bearing either capital or lower case letters, or both, as well as cards bearing the representation of a physical thing, such as an apple, coupled with the word "apple" written in both capital and lower case lettering with the initial letter "a" being emphasized so that a student may draw a visual association between the physical thing and the letter of the alphabet being taught. Such a kit obviously has an extremely limited utility and is suitable for teaching such subjects as the alphabet, or spelling, at an extremely elementary level.

Another prior patent of interest is the Ginsberg U.S. Pat. No. 4,132,406, dated Jan. 2, 1979, which discloses a word game wherein a plurality of bodies or game pieces representing letters of the alphabet, and colour coded as to letter type, are placed in the middle of the table. Each player makes a selection of a number of such bodies and mounts them in his rack to spell a certain word with the colour of each body being visible to the other players but not the letters. The other players attempt to guess what word has been spelled, and may ask that selective ones of the bodies be moved so that the letter appearing on it is visible in order to facilitate a guess as to what word has been spelled. There are of course a number of similar games known in the prior art such as the popular word game available under the trade mark "Scrabble" in which players attempt to form words from letter bearing members selected in some random manner. Indeed, the Kuhlman U.S. Pat. No. 3,116,927 issued Jan. 7, 1964 discloses a similar type game in which the game pieces carry entire words, the game pieces being selected in a random manner and utilized by each player to form sentences. Such games are useful in teaching spelling or word usage at a very elementary level, but have essentially no value in teaching a student to analyse a sentence grammatically.

Other prior patents of interest are U.S. Pat. Nos. 2,204,931—Gonzalez, issued June 18, 1940; 2,913,137—Alatorone, issued Nov. 17, 1959; 4,084,816—Shafer, issued Apr. 18, 1978; and 4,142,305—Zegel, issued Mar. 6, 1979.

SUMMARY OF THE INVENTION

I have found that the deficiencies of prior art teaching methods and teaching aids may be largely eliminated through the provision of a kit for the teaching of grammatical aspects of language in accordance with the invention. The kit comprises a plurality of question cards, each containing a different sentence of a predetermined number of words, and a plurality of answer cards, each containing a sentence corresponding to that on one of the question cards, and each bearing indicia displaying the correct parsing of such sentence at a given level of compexity. The kit includes at least one such answer card corresponding to each question card, although, in a preferred form, there will be a plurality, for example three, answer cards corresponding to each question card so that the same sentence will be shown analysed at increasing levels of precision and complexity. The kit will also be provided with a plurality of answer forming chips which are colour coded to represent different basic parts of speech or speech functions, and at least some of which bear indicia further qualifying such basic parts of speech. Additionally, the kit will include at least one support member adapted to receive and support the answer forming chips for visual display. The support member will of course need to be of sufficient size to permit display of enough answer forming chips to completely parse each sentence upon each question card at a given level of complexity.

Such a kit may form a suitable aid for teaching a wide variety of languages. However, for purposes of illustration this specification will illustrate use of the kit only in conjunction with the English language. Further, the kit may be used as a teaching aid, in the classical sense, although it may also be employed as an educational game or amusement device, and, as one of the principal objects of the kit is to make language learning more palatable to a student, the kit will be described in the game or amusement device context.

Although the game is adapted to be played at fifteen different levels of increasing grammatical complexity, the sequence of play is generally the same at each level and, while the kit in its use will be described in greater detail hereafter, the sequence of play at the first or lowest level is typical and may be summarized as follows:

1. The question cards containing sentences composed of anywhere from one to six words are arranged, face down, in six piles depending upon the number of words of which the sentence is composed, and the cards in each pile are shuffled prior to play.

2. Answer cards are placed in a pile face down, the answer cards being numbered to coincide with a corresponding question card.

3. Each player is issued with a number of answer forming chips sufficient to permit play at the given level, and a support or stand upon which the chips may be placed to form the answer.

4. The first player rolls a die to determine from which question pile he will select a question. For example, if he rolls a "5", he will select the card from the top of the "five" pile which contains sentences consisting of five words.

5. The player, with the aid of the answer forming chips with which he has been issued, (which in the case of level one will simply be colour coded and contain appropriate indicia to identify nouns, verbs, adjectives, adverbs, conjunctions and prepositions), will arrange the chips in a row in the stand or support to coincide with the part of speech of each word of which the sentence is composed. For example, if the sentence commences with a noun followed by a verb, the first chip placed in the first row of the holder will be coloured to identify a noun, and also bear indicia to identify a noun, the second chip placed in the holder will be coloured to identify a verb, and will bear indicia identifying it as a verb, with the result that, in order to obtain a perfect score for his initial turn at the game, the player must correctly identify each word of which the sentence is composed, which, if identified correctly, will result in a score of five (the sentence being composed of five words).

6. The answer card which corresponds in number with the question card selected by the first player will then be checked to see whether the player has correctly identified each of the words of which the sentence is composed, and of course the player is scored accordingly.

7. The next player then rolls a die to select a question card, and the process is repeated for the second player, and so on until one of the players attains a winning total score.

Each level of the game is played in a similar manner, although the information which must be supplied in respect of each word of the sentence, or indeed each phrase or clause, becomes increasingly more detailed until the final level is reached at which point a player will be required to completely parse each sentence in considerable detail.

BRIEF DESCRIPTION OF THE DRAWINGS

In the drawings which illustrate the invention.

Figure 1A:
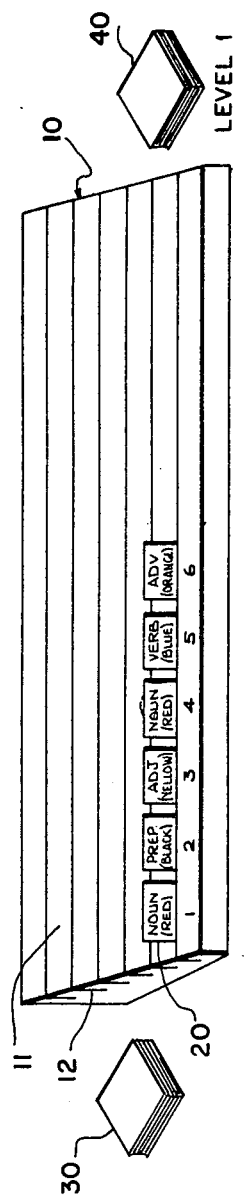
FIGS. 1(a), 1(b), and 1(c) are diagrammatic illustrations of answer forming chips arranged in a stand to show correct parsing of a sentence at levels one, two and three representing stage one or a first set of question cards, with the sentence from the question card being displayed below the stand in FIG. 1(a)

On the drawings, the following abbreviations are used to identify parts of speech or speech functions:

PREP.=preposition
ADJ.=adjective
ADV.=adverb
P. ADJ.=predicate adjective
PAST (GREEN)=past participle
TRAN.=transitive
LIM.=limiting
SING.=singular
INTRAN.=intransitive
MANN.=manner
SUBJ.=subject
M. SUBJ.=mofifies subject
M. O. PREP.=modifies object of preposition
O. PREP.=object of preposition
PRES.=present tense
M. VERB.=modifies verb
INDEF.=indefinite
PERS.=personal
LINK=linking verb
DES=descriptive
PAST=past tense
O. PREP.=object preposition
D. OBJ.=direct object
M. VERB=modifies the verb
CONJ.=conjunction
AUX.=auxiliary verb
M. BLUE=medium blue
POSS.=possessive
C. CONJ.=coordinating conjunction
EMPH=emphatic tone of verb
M.O. INF.=modifies the object of an infinitive
O. INF.=object of an infinitive
SUB.=subordinating conjunction
D. GREY=dark grey
COND.=conditional tone
M.D.OBJ.=modifies the direct object
M.P. ADJ.=modifies predicate adjective

DESCRIPTION OF THE PREFERRED EMBODIMENT

Referring now to the drawings, which illustrate some components of a kit which are used by a student or player to parse a given sentence at fifteen levels of increasing complexity through five different stages, represented by five different sets of answer cards, the answer forming chips are designated 20, and the stand or support for the answer forming chips is designated 10. As will appear from the drawing, the stand, which is constructed of any suitable material such as wood or plastic, is provided with a downwardly sloping front face 11 in which is arranged a plurality of parallel slots 12 which extend the length of the stand, and which are adapted to receive the lower margin of the answer forming chips to maintain the chips in an upright visible manner. In the illustrated embodiment, the stand is provided with six such slots, although it will be appreciated that the number of slots may vary depending upon the number of answer forming chips required to completely parse a given sentence. For the English language, six such slots are sufficient, although a different number of slots may be more appropriate for use in other languages.

The answer forming chips 20, are preferably constructed of plastic material, and are of about two centimeters in length and one and a half centimeters in width. The chips are coloured to represent different basic parts of speech or speech functions, and, while some chips may bear no other indicia, the majority of the chips also bear indicia to identify and further qualify the parts of speech or speech functions represented by the colour of the chip. The kit will contain a sufficient number of such chips at each level of complexity to permit the kit to be used by a given number of players at the same time, for example four or six, so that a complete answer may be formed by each student or player at one of the fifteen complexity levels, and of course normally extra chips would be included to compensate for loss or breakage.

The object of the kit is to facilitate the teaching of grammar at ever increasing levels of complexity, so that a student can start at the lowest level one and progress through all fifteen levels of complexity to the stage where the student will be in a position to completely parse any sentence with a high level of proficiency. Accordingly, it will be useful at this point to define and distinguish the various levels of complexity for which the game is designed which levels will determine the colour of, and the indicia appearing on the answer chips utilized by a player at the given level of complexity.

LEVEL ONE

At this level, each word forming each sentence (which will consist of from one to six words and be derived from a question card to be described hereafter), is identified only as to its basic part of speech, there being six in all: noun (red), verb (blue), adjective (yellow), adverb (orange), preposition (black), and conjunction (grey). The bracketed expression after each basic part of speech identifies the colour of the answer chip which represents that part of speech or speech function.

The correct parsing of a typical sentence at complexity level one is shown in FIG. 1(a).

LEVEL TWO

At the second level, the six basic parts of speech learned at level one are further qualified as follows:

nouns are identified as being proper, singular or plural;

verbs are qualified as being either transitive or intransitive;

adjectives are qualified as being either limiting or descriptive;

adverbs are qualified as relating to time, place, manner or degree;

prepositions are qualified as introducing either adverb phrases or adjective phrases;

conjunctions are qualified as coordinating or correlative.

Figure 1B:
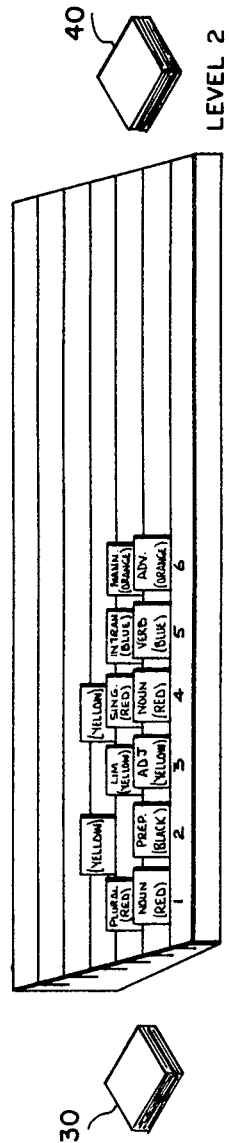

Accordingly, in order to parse a sentence at level two, it is not only necessary for the student to correctly identify each basic part of speech by inserting answer chips in the first slot of the stand as in level one, but, additionally, further qualifying chips must be inserted in the second and third slots of the stand to qualify the basic parts of speech or the speech function of a phrase. For example, in the answer displayed in FIG. 1(b), yellow plastic chips are used to identify the phrase introduced by the preposition "with" as being an adjective phrase, and to indicate the beginning and the end of the phrase. Unless otherwise specifically indicated (as in the case of the yellow answer chips in the third slot) the answer chips appearing in a transverse row in the stand will all be of the same colour. For example, the plural answer chip in the second slot disposed behind the red noun answer chip in the first slot will also be red in colour.

LEVEL THREE

Level three includes all of the grammatical distinctions learned at levels one and two, as well as the following additional grammatical distinctions:

nouns are further qualified as being subjects, direct objects, indirect objects or objects of prepositions;

verbs are further qualified as being present tense or past tense;

adjectives are further qualified as modifying subjects, direct objects, indirect objects or objects of prepositions;

adverbs are further qualified as modifying verbs, adjectives or adverbs;

prepositions are further qualified as introducing adjective phrases that modify subjects, direct objects, indirect objects or objects of prepositions, or as introducing adverb phrases which modify verbs, adjectives or adverbs.

Figure 1C:
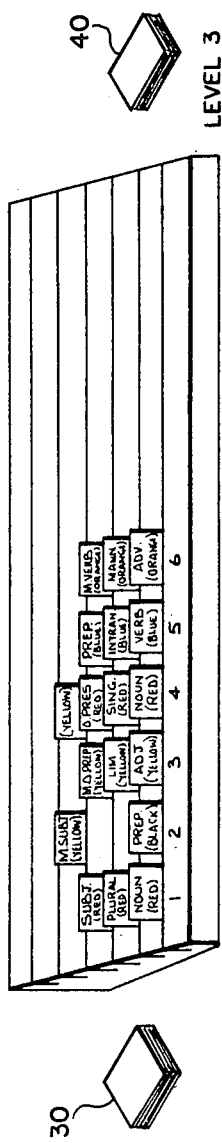

FIG. 1(c) illustrates the correct answer arrangement for the same sentence as that parsed at levels one and two, but including the additional grammatical distinctions to be learned at the third level. The yellow chips in the fourth slot indicate the beginning and end of an adjective prepositional phrase modifying the subject.

LEVEL FOUR

Level four repeats the grammatical distinctions learned at level one and includes the following additional parts of speech and grammatical distinctions:

pronouns (pink).

LEVEL FIVE

Level five repeats the grammatical distinctions learned at levels one, two and four, and includes the following additional grammatical distinctions:

pronouns are qualified as personal, indefinite, demonstrative, interrogative or reflexive;

verbs as auxiliary (medium blue) or linking (light blue).

LEVEL SIX

This level repeats the grammatical distinctions learned at all preceding levels and includes the following additional grammatical distinctions:

pronouns are qualified as being subjects, direct objects, indirect objects, objects of prepositions, predicate pronouns, nouns are qualified as predicate nouns, adjectives are qualified as predicate adjectives, or as modifying predicate nouns:

adverbs are qualified as modifying predicate adjectives:

auxiliary verbs are qualified as being of future, present progressive, past progressive or future progressive tense:

linking verbs are qualified as being of present, past, future, present progressive, past progressive or future progressive tense;

prepositions are qualified as introducing phrases that are used as predicate adjectives.

Figure 2:
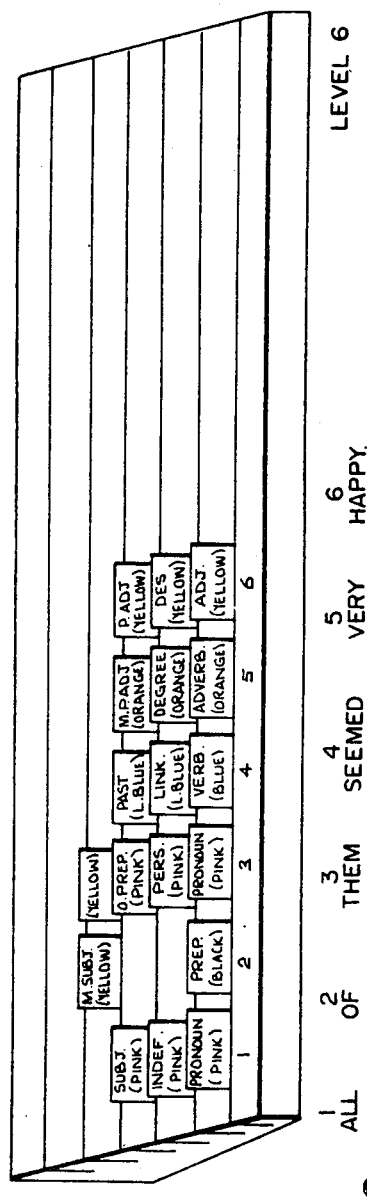
FIG. 2 is a diagrammatic illustration corresponding to those of FIG. 1 referable to stage two or a second set of question cards.

Correct parsing of a sentence at complexity level six is illustrated in FIG. 2. The chips in the fourth slot are yellow to show the beginning and ending of an adjective prepositional phrase.

LEVEL SEVEN

Level seven repeats the grammatical distinctions learned at levels one and four and includes the following additional parts of speech: gerunds (purple), participles (green) and infinitives (brown).

LEVEL EIGHT

This level repeats the grammatical distinctions learned at levels one, two, four, five and seven and includes the following additional grammatical distinctions: gerunds are identified as nouns;

participles are qualified as past or present;

infinitives are identified as nouns, adjectives or adverbs.

LEVEL NINE

This level repeats the grammatical distinctions learned in all of the preceding levels one to eight, and adds additional grammatical distinctions: gerunds are identified as subjects, direct objects, objects of prepositions or predicate nouns;

participles are qualified as modifying subjects, direct objects, indirect objects, objects of prepositions, predicate nouns, predicate pronouns or predicate adjectives;

verbs are qualified as to being present perfect, past perfect or future perfect tense;

auxiliary verbs are qualified as being present, past perfect or future perfect tense;

linking verbs are qualified as being present perfect, past perfect or future perfect tense.

Figure 3:
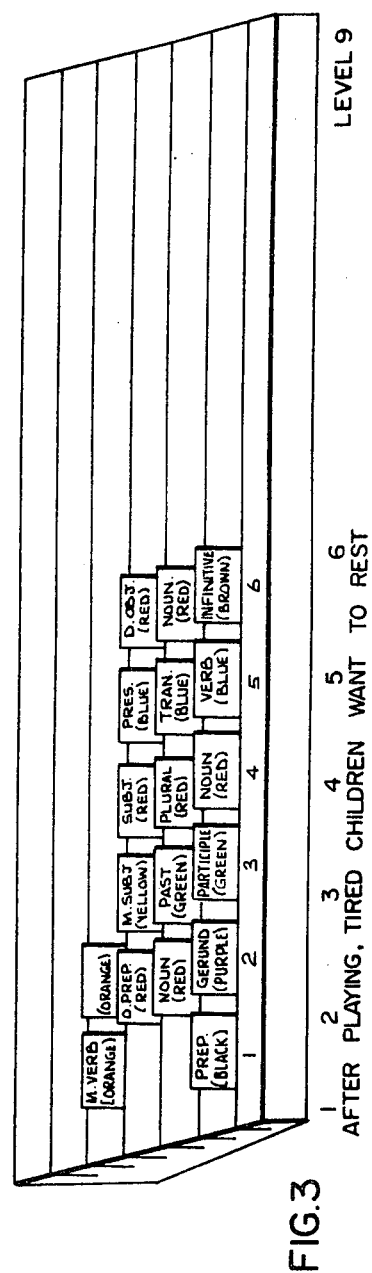
FIG. 3 is a diagrammatic illustration corresponding to FIG. 1 referable to stage three or a third set of question cards.

The correct parsing of a sentence at complexity level nine is illustrated in FIG. 3. The orange chips appearing in the fourth slot represent the beginning and end of an adverb prepositional phrase.

LEVEL TEN

This level repeats the grammatical distinctions learned at levels one, four and seven. At this level sentences containing from two to twelve words are introduced. There are nine sentences. Although no new grammatical distinctions are introduced, this level allows the student/player to review and consolidate in more complex sentence structures the labeling of all the parts of speech according to the colour code. This challenges the student/player to recognize parts of speech as they appear in diverse patterns not recognizable in sentences that have only six words in them.

Example: nouns and pronouns, with the adjectives that modify them, often follow gerunds, participles, and infinitives.

LEVEL ELEVEN

This level repeats the grammatical distinctions learned at levels one, two, four, five, seven, eight and ten. The new elements that must be recognized by the student/player on this level are illustrative of the grammatical fact that words are joined together to form phrases. The student/player has already been introduced to prepositional phrases and verb phrases, but now he must learn to recognize gerund phrases, participal phrases, and infinitive phrases. These phrases are represented by the colours which indicate how they are used in the sentence.

Example: gerund phrases are always used in noun functions, and so they are marked off in (red).

participal phrases are always used in adjective functions, and so they are marked off in (yellow).

infinitive phrases can be used as nouns, adjectives, or adverbs, and so they are marked off in (red), (yellow), or (orange).

LEVEL TWELVE

This level repeats all of the grammatical distinctions learned in the preceding levels one through eleven. Phrases must be labeled according to their function in the sentence.

Since gerund phrases are always used as nouns, the student/player must recognize the phrase as a subject, direct object, predicate noun, object of a preposition, object of a gerund, object of a participle, or as an object of an infinitive.

Since participal phrases are always used as adjectives, the student/player must recognize the phrase as it modifies noun functions within the sentence.

Since infinitive phrases are used as nouns, adjectives, or adverbs, the student/player must recognize the phrase in one of the noun functions, or as an adjective which modifies one of the noun functions, or as an adverb modifying a verb, adjective, or another adverb.

All passive voice forms of the tenses of verbs, including auxiliary or linking verbs, that already have been introduced, must be recognized.

Figure 4:
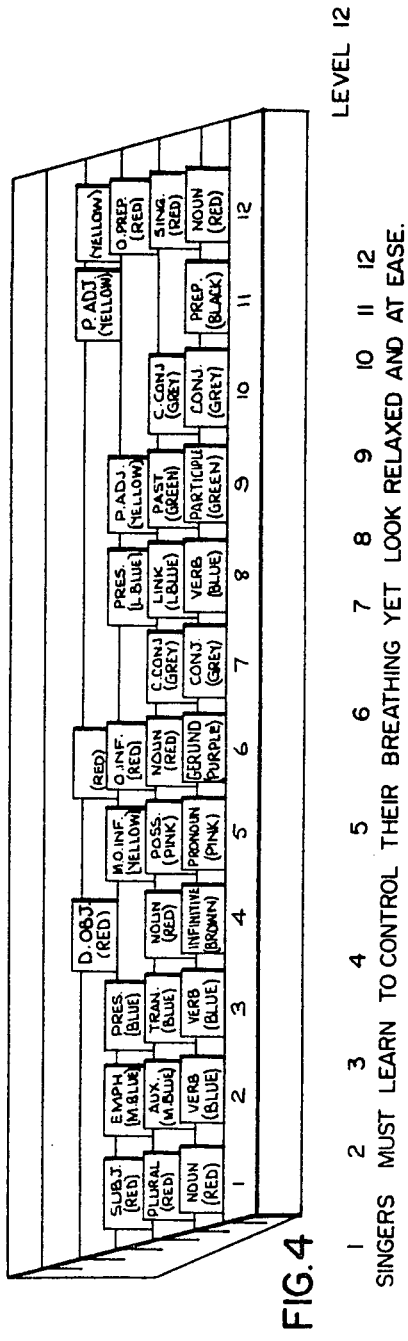
FIG. 4 is a diagrammatic illustration corresponding to FIG. 1 but referable to stage four or a fourth set of question cards.

Correct parsing of a sentence at complexity level twelve is illustrated in FIG. 4. The red chips in the fourth slot mark the beginning and end of a noun infinitive phrase whereas the yellow chips in the same slot mark the beginning and end of a prepositional phrase used as a predicate adjective.

LEVEL THIRTEEN

This level repeats the grammatical distinctions learned at levels one, four, seven and ten, and includes the following additional grammatical distinctions: subordinating conjunctions (dark grey), relative pronouns (pink), conjunctive adverbs (orange).

LEVEL FOURTEEN

This level repeats all of the grammatical distinctions learned at levels one, two, four, five, seven, eight, ten, eleven and thirteen. The new elements that must be recognized by the student/player on this level are illustrative of the grammatical fact that words are joined together to form clauses. The student/player must learn to recognize subordinate clauses used as nouns, subordinate clauses used as adjectives, and subordinate clauses used as adverbs.

LEVEL FIFTEEN

This level repeats the grammatical distinctions learned at all preceding levels one through fourteen. The new elements that must be recognized by the student/player on this level illustrate that subordinate clauses must be labeled according to their function in the sentence. Noun subordinate clauses are labeled in one of the noun functions, adjective subordinate clauses are labeled as modifying one of the noun functions, adverb subordinate clauses are labeled as modifying verbs, adjectives, or other adverbs.

All the remaining types of verbs, including auxiliary and linking, must be recognized according to their differences in tense, tone, voice, and mood.

Figure 5:
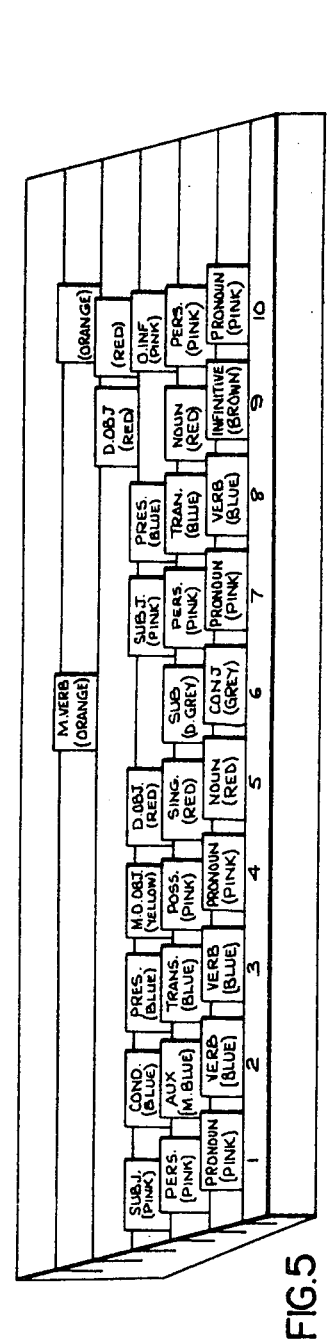
FIG. 5 is a diagrammatic illustration corresponding to FIG. 1 but referable to stage five or a fifth set of question cards.

Correct parsing of a sentence at complexity level fifteen is illustrated in FIG. 5. The two red chips in the fourth slot represent a noun infinitive phrase used as a direct object. The two orange chips in the fifth slot represent the beginning and end of an adverb subordinate clause that modifies the main verb.

The kit will include five sets of ninety-nine question cards 30 each to be used in each of five stages of grammatical development represented by each group of three complexity levels described above. For example, stage one will comprise complexity levels one to three and utilize one set of ninety-nine question cards; stage two will comprise levels four to six, and use a second set of question cards; stage three will comprise levels seven to nine, and use a third set of question cards; stage four will comprise levels ten to twelve, and use a fourth set of question cards; stage five will comprise levels thirteen to fifteen inclusive, and use a fifth set of question cards. The sets of ninety-nine question cards used in stages one, two and three (levels one through three, levels four through six, and levels seven through ten) will carry sentences ranging from one to six words, there being, at each stage, fourteen cards carrying one-word sentences, fifteen cards carrying two-word sentences, sixteen cards carrying three-word sentences, seventeen cards carrying four-word sentences, eighteen cards carrying five-word sentences, and nineteen cards carrying six-word sentences. For the two stages four and five, each stage will again utilize a set of ninety-nine question cards, although these question cards will carry sentences ranging from two words to twelve words, and there will be nine cards for each group of sentences ranging from two words to twelve words.

The question cards used in each stage will be numbered from one to ninety-nine, and designated to identify the stage to which each pertains. A typical question card for the fifth stage (levels thirteen, fourteen and fifteen) is shown in Table 1 (the number 11 in the upper left corner indicates the number of words in the sentence).

TABLE 1

| V - A - 11 | | | | | LEVELS 13, 14, 15. |
|---|---|---|---|---|---|
| 85. TREES | THAT | STAND | ON | THE | CLIFF |
| SWAY | WHEN | THE | WIND | BLOWS. | |

At each level there will be a set of ninety-nine answer cards 40 which illustrate the correct parsing of each sentence on each question card in each stage for the three levels of complexity which each stage embraces. These answer cards will be identified to correspond with the identification applied to each question card, and, additionally, will be further identified to indicate the level to which the answer pertains, as there will be three different answer cards for each question card in each stage to correspond with the three levels of complexity in each stage. Tables 2, 3 and 4 illustrate typical answer cards for the sentence in Table 1 for levels thirteen, fourteen and fifteen respectively.

TABLE 2

| V - A - 85 | | | | | LEVEL 13 |
|---|---|---|---|---|---|
| 85. TREES | THAT | STAND | ON | THE | CLIFF |
| (red) | (pink) | (d. blue) | (black) | (yellow) | (red) |
| SWAY | WHEN | THE | WIND | BLOWS. | |
| (d. blue) | (d. grey) | (yellow) | (red) | (d. blue) | |

TABLE 3

| V - Aa - 85 | | | | | LEVEL 14 |
|---|---|---|---|---|---|
| plur | rel | intran | | lim | sing |
| 85. TREES | THAT | STAND | ON | THE | CLIFF |
| (red) | (pink) | (d. blue) | (black) | (yellow) | (red) |
| intran | sub | lim | sing | intran | |
| SWAY | WHEN | THE | WIND | BLOWS. | |
| (d. blue) | (d. grey) | (yellow) | (red) | (d. blue) | |

TABLE 4

| V - Ab - 85 | | | | | LEVEL 15 |
|---|---|---|---|---|---|
| | | m. subj (yellow _____) | | | |
| | | | | m. verb (orange _____) | |
| subj | subj | pres | | m.o. prep | o. prep |
| plur | rel | intran | | lim | sing |
| 85. TREES | THAT | STAND | ON | THE | CLIFF |
| (red) | (pink) | (d. blue) | (black) | (yellow) | (red) |
| | | m. verb (orange _____) | | | |
| pres | | m. subj | subj | pres | |
| intran | sub | lim | sing | intran | |
| SWAY | WHEN | THE | WIND | BLOWS. | |
| (d. blue) | (d. grey) | (yellow) | (red) | (d. blue) | |

It is contemplated that the kit will include an instruction manual to provide the student or player with all of the information required to correctly parse a sentence at each level of complexity, although of course the kit may be utilized without such a manual, the grammar simply being taught by a teacher or instructor. The instruction manual will be quite detailed and may serve as a text book. It is also contemplated that the kit will include a number of cue cards which may be retained by the player or student for reference during play of the game, and which will include essential information to enable the player, by correctly applying the information, to correctly parse a sentence at each level of complexity. Typical cue cards for levels seven, eight and nine are shown in Tables 5, 6 and 7 respectively. It will be noted that information, such as that concerning infinitives is repeated on each card so that the student has the information before him for an extended period of time.

TABLE 5

| CUE CARD | III - A - (1-99) (level #7) |
|---|---|
| INFINITIVE (brown line) | is a verb form ordinarily introduced by to. It is coloured brown to |

TABLE 5-continued

| CUE CARD | III - A - (1-99) (level #7) |
|---|---|
| TO + VERB (examples) to find to go to run to be to think to dream | indicate that it has some verb qualities (blue) but it may be used as a noun (red), adjective (yellow) or as an adverb (orange) Like a verb it can: be modified by an adverb have a subjet be followed by an object As a noun (red) it can function as a subject, direct object, or as a subjective complement. As an adjective (yellow) it can modify a noun or a word functioning as a noun. As an adverb (orange) it can modify a verb, adjective or an adverb. eg. To ensure health you should go to see a doctor and find a way to exercise. to ensure used as a noun - subject to see used as an adverb modifying a verb to exercise used as an adjective. |

TABLE 6

| CUE CARD | III - Aa - (1-99) | (level #8) |
|---|---|---|
| INFINITIVE (brown line) TO + VERB (examples) to find to go to run to be to think to dream | is a verb form ordinarily introduced by to. It is coloured brown to indicate that it has some verb qualities (blue) but it may be used as a noun (red), adjective (yellow) or as an adverb (orange) Like a verb it can: be modified by an adverb have a subject be followed by an object As a noun (red) it can function as a subject, direct object, or as a subjective complement. As an adjective (yellow) it can modify a noun or a word functioning as a noun. As an adverb (orange) it can modify a verb, adjective or an adverb. eg. To ensure health you should go to see a doctor and find a way to exercise, to ensure used as a noun - subject to see used as an adverb modifying a verb to exercise used as an adjective | on this level a red, yellow or orange chip is placed in the second slot above the brown chip in the first slot to indicate whether the infinitive is being used as a noun, adjective or an adverb. |

TABLE 7

| CUE CARD | III - Ab - (1-99) | (level #9) |
|---|---|---|
| INFINITIVE (brown line) TO + VERB (examples) to find to go to run to be to think to dream | is a verb form ordinarily introduced by to. It is coloured brown to indicate that it has some verb qualities (blue) but it may be used as a noun (red), adjective (yellow) or as an adverb (orange) Like a verb it can: be modified by an adverb have a subject be followed by an object As a noun (red) it can function as a subject, direct object, or as a subjective complement. As an adjective (yellow) it can modify a noun or a word functioning as a noun. As an adverb (orange) it can modify a verb, adjective or an adverb. eg. To ensure health you should go to see a doctor and find a way | on this level a red chip is placed in the third or fourth slot and is labelled subject, direct object or predicate noun or object of a prep. If the infinitive is used as an adj. a yellow chip labelled with its modifying function is similarily placed. If the infinitive is used as an adverb, an orange chip, |

TABLE 7-continued

| CUE CARD | III - Ab - (1-99) | (level #9) |
|---|---|---|
| | to exercise. | properly |
| | to ensure used as a noun - subject | labelled, is |
| | to see used as an adverb modifying a verb | used. |
| | to exercise used as an adjective | |

The kit, when it is used as a game, will also include a pair of dice. These may be obtained separately.

When the kit is used as a game, the procedure is that described previously in this specification. The object of the game is to reach a given score. At levels one through nine (stages one, two and three) only one die is used, and players attempt to reach a score of twenty-one, whereas at levels ten through fifteen (stages four and five) two dice are used (because up to twelve word sentences are employed), and the score needed to win is forty-two because of the greater amount of information required at these levels and the consequent higher score that will be attained with each roll of the dice, assuming the sentence is correctly parsed. This scoring system permits players at lower levels (one through nine) to play with those on higher levels (ten through fifteen) simply by doubling their score at each turn. If the player, at his turn, correctly arranges the answer chips in his stand in a manner corresponding to the arrangement appearing on the associated answer card, he is accorded maximum points for his turn which will correspond to the number of words in the sentence which he has parsed. Each mistake which is made (which will be apparent from comparing the players "answer" to the correct display appearing on the answer card), will result in deduction of one point. It is contemplated that the player must obtain the precise winning score of twenty-one or forty-two in order to win. Accordingly, if a player throws dice showing a number higher than the difference between the player's existing score and the winning score of twenty-one or forty-two he must lose his turn and pass the dice to the next player. If more than one player reaches the final score in the same round of play, then a tie results, and a tie breaker round must be played wherein each player must achieve the score that he throws on the dice (corresponding to the number of words in the sentence that he will be required to parse). Such tie breaker rounds will continue until one player exhibits an advantage over the other. It is to be noted that, in the tie breaker rounds, the number of words in the sentence is immaterial, as it is only mistakes which will disqualify a player, and if each player correctly parses his sentence (whether it be a two-word sentence or a twelve-word sentence) in the first tie breaker round, there is still no winner and a further round must be played.

When the kit is employed in an educational environment, it is contemplated that each student will be tested at each stage so that the instructor can assess whether the student should then progress to the next stage. Suitable standard tests could be incorporated as part of the kit.

It will be apparent that many modifications may be made to the kit and the manner in which the kit is used without departing from the objects and scope of this invention, and many modifications will readily become apparent to those adapting the kit for use in different languages, and to those utilizing the kit as means of educating students in language in an entertaining manner.

What I claim as my invention is:

1. A kit for teaching grammatical aspects of language at increasing levels of complexity comprising, a plurality of question cards, each containing a different sentence of a predetermined number of words; a plurality of answer cards, each containing a sentence corresponding to that appearing on one of said question cards, and each bearing indicia displaying the correct parsing of said sentence at a given level of complexity, there being at least one answer card corresponding to each question card; a plurality of answer forming chips each being colour coded to represent different basic parts of speech or speech functions, and at least some of which bear indicia further qualifying said basic parts of speech; and at least one answer forming chip support adapted to receive and support for visual display sufficient chips to identify and qualify each word, phrase or clause forming each sentence on each question card at a given level of complexity, said chips being supported in physical alignment relative to each word, phrase or clause being identified or qualified.

2. A kit according to claim 1 wherein there are five sets of ninety-nine question cards, each set of question cards being adapted for use at three levels of complexity.

3. A kit according to claim 2 wherein three sets of said set of questions cards contain sentences ranging in length from one to six words, there being fourteen one word sentences, fifteen two word sentences, sixteen three word sentences, seventeen four word sentences, eighteen five word sentences, and nineteen six word sentences in each of said three sets, and the remaining two sets of question cards containing sentences ranging in length from two to twelve words, there being nine of each in each of said two sets.

4. A kit according to claim 2 wherein there are three sets of answer cards for each set of question cards, each set of answer cards displaying the correct parsing of each sentence on an associated set of question cards, with each set of answer cards displaying the correct parsing of said sentences at successively increasing levels of complexity.

5. A kit according to claim 4 including at least one cue card containing a summary of grammatic rules for each level of complexity represented by each set of answer cards, and two dice which may be utilized in the selection of a question card.

6. A kit according to claim 1, in which said chips support comprises an elongated upwardly and rearwardly sloping surface, a plurality of spaced parallel horizontally disposed slots in said sloping surface adapted to receive and support said answer forming chips substantially vertically with indicia on each chip in each slot being visible to a viewer facing said sloping surface, said slots being of sufficient length to support one chip for each word in a sentence on any one of said question cards, and wherein there are at least six such slots.

7. A kit for teaching grammatical aspects of language comprising, five sets of ninety-nine question cards, each question card of each set containing a different sentence of a predetermined number of words, not exceeding twelve in number; three answer cards corresponding to each question card in each set of question cards, each such answer card containing the sentence of its corresponding question card as well as colour coded indicia displaying the correct parsing of the sentence at a given level of complexity, there being three levels of complexity referable to each set of question cards; a plurality of answer forming chips, each being colour coded to represent different basic parts of speech or speech functions, the majority of said chips bearing indicia identifying said basic parts of speech or qualifications pertaining thereto, there being at least sufficient chips to permit use thereof to completely parse any sentence on any question card at any level of complexity represented by any answer card; a plurality of elongated chip holders, each holder having an upwardly sloping elongated surface provided with a plurality of elongated parallel slots arranged in spaced apart relationship up the sloping surface of said holder whereby to support said chips substantially vertically with indicia on each chip in each slot being visible to a viewer facing said sloping surface, each slot adapted to receive and support one chip for each word in a sentence on any of said question cards, and there being sufficient slots to permit the display of chips sufficient to completely parse each sentence at any level of complexity; and a pair of dice.

8. A kit according to claim 7 including a detailed instruction manual containing all required grammatical information.

* * * * *